Nov. 3, 1959  R. SOLISCH  2,910,914
PHOTOGRAPHIC OR CINEMATOGRAPHIC HIGH-SPEED TELE-OBJECTIVE
Filed Oct. 29, 1958
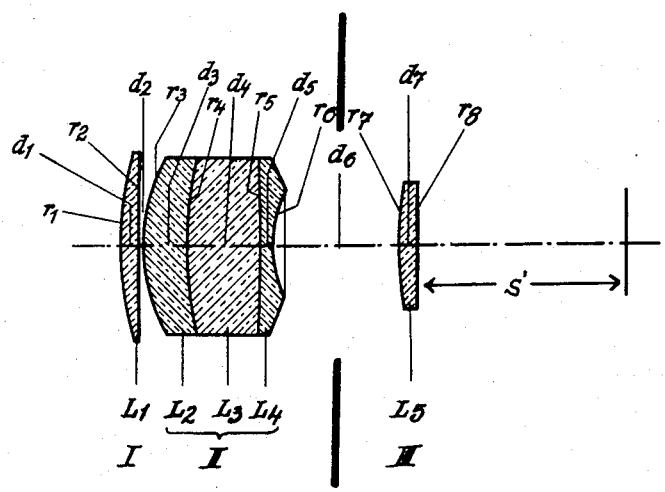
INVENTOR:
Rudolf SOLISCH
BY
Agent

United States Patent Office 2,910,914
Patented Nov. 3, 1959

2,910,914

PHOTOGRAPHIC OR CINEMATOGRAPHIC HIGH-SPEED TELE-OBJECTIVE

Rudolf Solisch, Gottingen, Germany, assignor to Isco Optische Werke G.m.b.H., Gottingen-Weende, Germany, a corporation of Germany Application October 29, 1958, Serial No. 770,439

Claims priority, application Germany November 4, 1957

1 Claim. (Cl. 88—57)

My present invention relates to photographic or cinematographic objectives of large focal length, i.e. to so-called tele-objectives, in which a two-component lens group on the object side of a diaphragm space, i.e. on the side of the longer light rays, co-operates with a single lens component on the image side, or side of the shorter light rays.

Heretofore, tele-objectives of the character described had to be composed exclusively or for the most part of lenses made from highly refractive and therefore expensive glasses if good correction of aberrations coupled with a large aperture ratio (e.g. 1:2.8) was desired. My invention has for its object the provision of an optical objective of this type which is more economical to manufacture and utilizes relatively cheap glasses for the majority of its constituent lens elements.

I have found, in accordance with the present invention, that this object may be realized by the use of a front component consisting of two air-spaced members, namely a preferably meniscus-shaped collective singlet followed by a meniscus-shaped negative triplet, the central element of the triplet being a biconvex lens element. Good correction and an aperture ratio of 1:2.8 or higher may be realized with such system if each of the three positively refracting elements of the front group, i.e. the singlet and the two forward elements of the triplet, is made of a glass whose refractive index for the yellow $n_d$ line of the spectrum is less than 1.60.

For best results, particularly in regard to the suppression of chromatic aberrations, the refractive index of the meniscus-shaped forward element of the triplet should exceed that of the adjoining biconvex element by a value ranging between substantially 0.1 and 0.07.

The invention will be described in greater detail with reference to the accompanying drawing the sole Figure of which illustrates a preferred embodiment.

The tele-objective shown in the drawing comprises a front group, consisting of a singlet I and a triplet II, and a single rear component III. Singlet I is a meniscus-shaped, almost plano-convex positive lens $L_1$ having radii of curvature $r_1$, $r_2$ and thickness $d_1$; it is separated by an air space $d_2$ from the triplet II consisting of lens elements $L_2$, $L_3$, $L_4$ cemented together. Lens element $L_2$, having radii $r_3$, $r_4$ and thickness $d_3$, is a positive meniscus whose cemented surface $r_4$ is negatively refracting, owing to the fact that lens element $L_3$ (radii $r_4$, $r_5$ and thickness $d_4$) is biconvex and has a lower refractive index than element $L_2$. Lens element $L_4$ (radii $r_5$, $r_6$ and thickness $d_5$) is biconcave and represents the only part of the front group which has an index of refrecation greater than 1.60; it will be noted that its cemented surface $r_5$ is also negatively refracting, as is of course its outer surface $r_6$, the entire triplet II having thus a single condensing surface ($r_3$) and three scattering surfaces. Rear component III, separated from triplet II by a diaphragm space $d_6$, is shown as a single plano-convex lens $L_5$ having radii $r_7$, $r_8$ and thickness $d_7$; similarly to lens element $L_4$, the singlet $L_5$ also consists of a glass of relatively elevated index of refractivity exceeding 1.60.

The system shown in the drawing may be designed for a relative aperture of 1:2.8 and a back-focal length of $s'=41.15$, based upon an overall focal length of numerical value 100. Representative numerical values for the parameters $r_1$ to $r_8$ and $d_1$ to $d_7$ of lenses $L_1$ to $L_5$, together with the refractive indices $n_d$ and the Abbé numbers $\nu$ thereof, are given in the following table.

Table

| Lens | Radii | Thicknesses and Air Spacings | $n_d$ | $\nu$ |
|---|---|---|---|---|
| I { $L_1$ | $r_1=+\ 66.06$ | $d_1=\ 3.6$ | 1.58913 | 61.2 |
|  | $r_2=+683.64$ | $d_2=\ 0.1$ | air space |  |
| II { $L_2$ | $r_3=+\ 35.00$ | $d_3=\ 9.1$ | 1.59181 | 58.3 |
|  | $r_4=+\ 76.42$ | $d_4=14.8$ | 1.51454 | 54.6 |
| { $L_3$ | $r_5=-206.64$ | $d_5=\ 2.3$ | 1.71736 | 29.5 |
| { $L_4$ | $r_6=+\ 23.66$ | $d_6=24.6$ | diaphragm space |  |
| III { $L_5$ | $r_7=+\ 71.09$ | $d_7=\ 3.7$ | 1.69895 | 30.1 |
|  | $r_8=\ \infty$ |  |  |  |
|  |  | $d_{total}=58.2$ |  |  |

It will be seen that the refractive indices $n_d$ of the front lens $L_1$ and of the two forward constituents $L_2$, $L_3$ of triplet II are all less than 1.60 and that the refractive index of lens element $L_2$ exceeds that of lens element $L_3$ by a value of approximately 0.08, the latter ranging between the limits of 0.07 and 1.0 set forth above.

I claim:

An optical tele-objective system comprising a two-component front lens group and a single rear lens component, said front group consisting of a collective singlet followed by a meniscus-shaped dispersive triplet, said rear component being a positively refracting lens, said numerical values of the radii of curvature $r_1$ to $r_8$ of said singlet $L_1$, the constituents $L_2$, $L_3$, $L_4$ of said triplet, and said rear component $L_5$, as well as the thicknesses and air spacings $d_1$ to $d_7$ thereof, based upon a numerical value of 100 for the overall focal length of the system, the refractive indices $n_d$ of the elements $L_1$ to $L_5$ and the Abbé numbers $\nu$ thereof being substantially as given in the following table:

| Lens | Radii | Thicknesses and Air Spacings | $n_d$ | $\nu$ |
|---|---|---|---|---|
| $L_1$ | $r_1=+\ 66.06$ | $d_1=\ 3.6$ | 1.58913 | 61.2 |
|  | $r_2=+683.64$ | $d_2=\ 0.1$ | air space |  |
| $L_2$ | $r_3=+\ 35.00$ | $d_3=\ 9.1$ | 1.59181 | 58.3 |
| $L_3$ | $r_4=+\ 76.42$ | $d_4=14.8$ | 1.51454 | 54.6 |
| $L_4$ | $r_5=-206.64$ | $d_5=\ 2.3$ | 1.71736 | 29.5 |
|  | $r_6=+\ 23.66$ | $d_6=24.6$ | diaphragm space |  |
| $L_5$ | $r_7=+\ 71.09$ | $d_7=\ 3.7$ | 1.69895 | 30.1 |
|  | $r_8=\ \infty$ |  |  |  |

References Cited in the file of this patent

UNITED STATES PATENTS

| 2,141,733 | Bertele | Dec. 27, 1938 |
| 2,171,274 | Merte | Aug. 20, 1939 |
| 2,443,156 | Altman et al. | June 8, 1948 |
| 2,622,479 | Bertele | Dec. 23, 1952 |

FOREIGN PATENTS

| 350,323 | Great Britain | June 11, 1931 |